United States Patent [19]

Bauermann

[11] 4,191,787
[45] Mar. 4, 1980

[54] PROCESS FOR PREPARING A PASTEURIZED MEAT-CONTAINING SALAD

[75] Inventor: Julius F. Bauermann, Chalfont, Pa.

[73] Assignee: Horace W. Longacre, Inc., Franconia, Pa.

[21] Appl. No.: 927,650

[22] Filed: Jul. 24, 1978

[51] Int. Cl.$^2$ ............................................. A23L 1/212
[52] U.S. Cl. ................................... 426/615; 426/129; 426/643; 426/644; 426/641; 426/392; 426/332
[58] Field of Search .............. 426/641, 643, 644, 521, 426/332, 331, 324, 392, 418, 534, 589, 615, 129, 650

[56] References Cited

U.S. PATENT DOCUMENTS

| | | | |
|---|---|---|---|
| 2,206,483 | 7/1940 | Meaker | 426/637 |
| 2,383,907 | 8/1945 | Beechem et al. | 426/331 |
| 2,434,388 | 1/1948 | Brehm | 426/643 |
| 3,038,810 | 6/1962 | Akerboom et al. | 426/643 |
| 3,115,409 | 12/1963 | Hallinan | 426/641 |
| 3,328,178 | 6/1967 | Alderton | 426/334 |
| 3,658,551 | 4/1972 | Bundus et al. | 426/332 |
| 3,852,486 | 12/1974 | Walker et al. | 426/332 |
| 3,892,058 | 8/1975 | Komatsu et al. | 426/412 |

OTHER PUBLICATIONS

"Oscar" of the Waldorf's Cookbook," by Oscar Tschirky, 1973, pp. 430-431.
"The Glasgow Cookery Book," by J. S. Glasgow, 1973, p. 209.

Primary Examiner—S. Leon Bashore
Assistant Examiner—Michael Goldman
Attorney, Agent, or Firm—Lowe, King, Price & Becker

[57] ABSTRACT

There is disclosed a novel process for preparing a pasteurized meat-containing salad having a long shelf-life under refrigeration. This process includes the essential steps of acid treatment and of high temperature-short time heat treatment.

10 Claims, No Drawings

PROCESS FOR PREPARING A PASTEURIZED MEAT-CONTAINING SALAD

BACKGROUND OF THE INVENTION

1. Field of the Invention

This invention relates to a process for preparing a pasteurized salad and to a salad produced by the process. More particularly, this invention relates to a process for preparing a pasteurized meat-containing salad having a long shelf-life under refrigeration.

2. Description of the Prior Art

It is advantageous in commercially preparing "fresh" meat-containing salads for storage under refrigeration that these salads have a long shelf-life. The shorter the shelf-life of a "fresh" salad, the higher the price which must be charged to the ultimate purchaser, as a result of the need to discard salad products which have spoiled. A salad having a long shelf-life reduces the possibility of spoilage during storage.

It is advantageous in preparing "fresh" meat-containing salads to use a process which is economically efficient.

Prior art processes of which Applicant is aware are unsuitable for producing "fresh" meat-containing salads since they produce salads of limited shelf-life and are economically inefficient.

Processes for preparing pasteurized salads which use acid in combination with heat treatment are generally known. Exemplary of such processes are U.S. Pat. No. 2,434,388 to Brehm and U.S. Pat. No. 2,206,483 to Meaker. Brehm infuses an acid solution well into the foodstuff prior to heat treatment. In the case of potatoes, for example, at least eight hours is required to infuse the acid. Brehm maintains the foodstuff at a heat treatment temperature (190° F.) for a substantial period of time. For example, 90 minutes is needed for one pound of salad and 5 hours for seven pounds. It can be seen then that this process is inefficient in terms of time and is therefore economically disadvantageous. Meaker is similar.

In the unrelated food preservation art, the use of acid in combination with heat treatment is also generally known. Exemplary of such processes are U.S. Pat. No. 2,383,907 to Beechem et al, U.S. Pat. No. 3,328,178 to Alderton, and U.S. Pat. No. 3,852,486 to Walker et al. Beechem et al relate to a process for preserving foods including red meats and fish, and Alderton relates to preserving various foods by sterilization. Beechem et al require an acid removal step prior to heat treatment, and Alderton requires a neutralization step prior to heat treatment. Walker et al relate to a process for preserving shell fish meat and require a chlorine treatment step prior to acid treatment; that acid treatment be carried out in the presence of an inorganic chloride and an antibacterial agent; and that the heat treatment step be carried out at a very high temperature (180° F. to 210° F.). It can be seen then that these processes are inefficient in terms of time and complexity and therefore economically disadvantageous.

SUMMARY OF THE INVENTION

In view of these deficiencies, it is therefore an object of this invention to provide a process for preparing a pasteurized meat-containing salad having a long shelf-life under refrigeration.

Another object of the invention is to provide a process which is economically efficient.

A still further object of this invention is to provide a pasteurized meat-containing salad having a long shelf-life under refrigeration.

Other objects and advantages of the present invention will become apparent as the description thereof proceeds.

To obtain these and other objects and advantages, the present invention provides a process for preparing a pasteurized meat-containing salad having a long shelf-life under refrigeration and the salad produced by this process. This process comprises treating a meat-containing salad with a food grade acidulant, rapidly raising the internal temperature of the acid-treated salad to a temperature greater than about 150° F. (65.5° C.), and less than about 170° F. (76.6° C.), and then immediately allowing the salad to cool.

DESCRIPTION OF PREFERRED EMBODIMENTS

As pointed out above, the present invention is concerned with a novel process for preparing a pasteurized meat-containing salad having a long shelf-life under refrigeration, and with a novel salad produced by such a process. The invention is based upon the surprising discovery that an acid treatment step in combination with a heat treatment step having certain limited parameters result in a new and improved process for preparing pasteurized meat-containing salads, and result in a new and improved salad characterized by a long shelf-life under refrigeration.

In its broadest embodiment, this novel process comprises treating a meat-containing salad with a food grade acidulant, and carrying out a high temperature-short time heat treatment step. The heat treatment step comprises rapidly raising the internal temperature of the acid-treated salad to a temperature greater than about 150° F. (65.5° C.) and less than about 170° F. (76.6° C.), and then immediately allowing the salad to cool. The limitations on the heat treatment step, it will be appreciated, significantly differ from prior art heat treatments which maintain the temperature at the treatment temperature for a substantial period of time.

The invention will now be described in detail.

The first essential step is an acid treatment step. In the acid treatment step, a meat-containing salad is treated with a food grade acidulant. Food grade acidulants are well known in the art and an exemplary and preferred acidulant is anhydrous citric acid. The acidulant is preferably any food grade essentially anhydrous acid, preferably a dry organic acid such as citric acid. Dry or anhydrous acids are preferred so that the product will not be too watery. However, liquid organic acids such as malic acid, lactic acid, or succinic acid may also be used but preferably with starch or a binder to take up the excess liquid. Mixtures of acids may also be used. The acidulant is added in sufficient quantity to adjust the pH of the salad mixture to the pH range of about 4.2 to 4.6. The preferred pH range is 4.40 to 4.45 in the final product. The acidity may be monitored by pH measurement. The acid treatment step is suitably performed at room temperature and at atmospheric pressure. The final pH is achieved within 24 hours after complete equilibrium is achieved and the heat treatment has been carried out.

In the preferred embodiment, the acid is added along with the meat, celery, salad dressing, seasonings and other food additives all at the same time. Perhaps 10-15 minutes may be required to thoroughly mix these ingredients, and then they are pumped up through the heat exchanger for the heat treatment and packaging. The pH equilibrium will occur within 24 hours, and not much less, after the heat treatment, although this may vary with the acidity of the other ingredients. In any event, the salad is heat treated prior to pH equilibrium.

The acid treatment step requires only a very short time, suitably less than 15 minutes. This is in contrast to prior art acidification such as that disclosed in U.S. Pat. No. 2,434,388 to Brehm which requires several hours for the acid to infuse into the foodstuff prior to heat treatment.

The next essential step is a high temperature-short time heat treatment step. There is no removal or neutralization of the acidulent prior to this step. The high temperature-short time heat treatment step comprises rapidly raising the internal temperature of acid-treated salad to a temperature greater than about 150° F. (65.5° C.) and less than about 170° F. (76.6° C.), and then immediately allowing the salad to cool. By internal temperature is meant the temperature at or near the center of the salad mass. Preferably, the internal temperature is raised to about 155°-160° F. (68.3° C.-71.1° C.). The temperature may be raised by the use of an external heat source such as a heat exchanger or other suitable means.

The heat treatment step is suitably performed at atmospheric pressure. It will be appreciated, however, that the heating portion of this step may be carried out at greater than atmospheric pressure in which case a lower temperature than that described above is necessary. Preferably, the salad mass is raised to the desired internal temperature in about two minutes of heating. Once the desired internal temperature is reached, the salad is immediately allowed to begin cooling.

The cooling is suitably carried out in a passive manner, that is, the internal temperature of the salad mass is allowed to return to approximately 120° F. (48.8° C.) without the use of external cooling such as refrigeration, except that as the internal temperature approaches approximately 120° F. (48.8° C.), external cooling such as refrigeration is used to bring this temperature to 40° F. (4.4° C.) or below. It will be appreciated by one skilled in the art that the cooling could be carried out entirely under refrigeration, but this alternative would require additional energy and accordingly, additional expense. The cooling is continued until a temperature of 40° F. (4.4° C.) or below is reached. Then, the salad is refrigerated at a temperature of about 40° F. (4.4° C.). As will be understood by one skilled in the art, the time required for cooling varies with the amount of salad being cooled, with more time being required for a greater amount. The cooling is carried out in a sealed container suitable for storage and marketing the salad to a consumer. The container is sealed at the beginning of cooling and when sealed, is air-tight so as to prevent spoilage.

Prior to treatment with the acidulant, a preferred salad would contain a meat, fresh celery and a salad dressing or mayonnaise. At the same time that the acidulant is added, flavoring agents are added. Accordingly, the salad produced by this process is preferably formulated of meat, fresh celery, salad dressing, mayonnaise and flavoring agents.

Exemplary meats for use in this process are poultry, fish, and red meat. Suitable flavoring agents are sugar or other sweeteners, spices, and spice extractives. Sufficient sugar, or other sweeteners, is added to balance the acidic taste produced by the acidulant and thereby increase the palatability of the salad and balance the acidity.

By this process there is produced a novel pasteurized meat-containing salad characterized by long shelf-life under refrigeration. It has been unexpectedly found that the salad of this invention will have a shelf-life as long as 32 weeks from date of manufacture, there being not any appreciable increase in bacterial growth during this period of time. This extraordinary shelf-life is found when the salad container is unopened during storage and kept under about 40° F. (4.4° C.) refrigeration. It should be noted that shelf-life has two aspects: microbiological and chemical. In this regard, the high side of the disclosed heating temperature range 150°-170° F. (65.5°-71.1° C.), i.e., in the range of 160° to 170° F. would be expected to shorten the chemical shelf-life because of chemical breakdown of the salad dressing and "oiling off". Microbiological shelf-life would not be essentially affected. Therefore, the preferred heating temperature is in the range of 150°-160° F.

The following example is presented to illustrate the invention but it is not considered to be limited thereto.

EXAMPLE

A preferred example of the present process will now be set forth. Pieces of cooked chicken of approximately ¾-1" in size are mixed in approximately equal proportions with fresh diced celery and salad dressing. To this salad mass there is added approximately 5% salt, sugar, seasonings and food additives. Among the food additives is a food grade acid, preferably anhydrous citric acid, to adjust the pH of the salad to approximately 4.2. Although quantity may vary, this acid usually is about 0.5% of the total salad mass. The salad mass after a 10 to 15 minute mixing period is rapidly heated to an internal temperature of about 155°-160° F. in approximately 2 minutes from the 40°-55° F. initial temperature. The heated salad is transferred to suitable plastic or other type containers, the lid is sealed, and the containers are immediately allowed to cool. Cooling is completed to approximately 40° F. in a refrigerated room in 6 to 8 hours for five-pound sized containers. Other sizes cool correspondingly quicker or longer depending upon their mass.

The invention has been described herein with reference to a certain preferred embodiment. However, as obvious variations thereon will become apparent to those skilled in the art, the invention is not to be considered as limited thereto.

What is claimed is:

1. A process for preparing a pasteurized meat and vegetable containing salad having a long shelf-life under refrigeration, said process consisting essentially of the following sequential steps:
    (a) preparing a meat-containing salad by mixing the meat with vegetables and any other ingredients;
    (b) subjecting said salad to an acid treatment by adding thereto a food grade acidulant in a sufficient amount to obtain a salad pH in the range of about 4.2 to 4.6;
    (c) then rapidly raising the internal temperature of the acid-treated salad to a temperature greater than about 150° F. and less than about 170° F.; and
    (d) immediately allowing the salad to cool.

2. The process according to claim 1 wherein prior to cooling step (d), the salad is transferred to a container suitable for storage and marketing, and cooled in said container.

3. The process according to claim 1 wherein the meat-containing salad is treated by adding a food grade acidulant to the salad in sufficient amount to acidify the salad to a pH of 4.40 to 4.45.

4. The process according to claim 1 wherein the internal temperature of the salad is raised to about 150°–160° F. in step (c).

5. The process according to claim 1 wherein the rapid raising of the internal temperature occurs over a period of about two minutes.

6. The process according to claim 1 wherein the meat-containing salad comprises a meat, fresh celery, and a salad dressing and/or mayonnaise.

7. The process according to claim 6 wherein the salad also contains a flavoring agent.

8. The process according to claim 1 wherein the acidulant is a food grade essentially anhydrous organic acid.

9. The process according to claim 1 wherein said acidulant is food grade anhydrous citric acid.

10. The process according to claim 1 wherein the salad is cooled to a temperature of about 40° F.

* * * * *